(12) United States Patent
Xue et al.

(10) Patent No.: US 12,071,932 B1
(45) Date of Patent: Aug. 27, 2024

(54) ADJUSTING METHOD OF YAW CONTROL STRATEGY, YAW CONTROL SYSTEM AND MEDIUM

(71) Applicants: China Three Gorges Renewables (Group) Co., Ltd., Beijing (CN); Three Gorges New Energy Offshore Wind Power Operation and Maintenance Jiangsu Co., Ltd, Jiangsu (CN); China Three Gorges New Energy (Group) Co., Ltd. Liaoning Branch, Liaoning (CN)

(72) Inventors: Haoning Xue, Beijing (CN); Pengyuan Lv, Beijing (CN); Jinjiang Lan, Beijing (CN); Yun Wang, Beijing (CN); Zhaorui Chai, Beijing (CN); Dongxing Gao, Beijing (CN); Long Jin, Beijing (CN); Mingzhe Liu, Beijing (CN); Chaoyue Geng, Beijing (CN); Xinyi Tan, Beijing (CN); Hongliang Song, Beijing (CN)

(73) Assignees: China Three Gorges Renewables (Group ) Co., LTD., Beijing (CN); Three Gorges New Energy Offshore Wind Power Operation and Maintenance Jiangsu Co., LTD., Beijing (CN); China Three Gorges New Energy (Group) Co., LTD. Liaoning Branch, Jiangsu (CN)

( * ) Notice: Subject to any disclaimer, the term of this patent is extended or adjusted under 35 U.S.C. 154(b) by 0 days.

(21) Appl. No.: 18/391,196

(22) Filed: Dec. 20, 2023

Related U.S. Application Data

(63) Continuation of application No. PCT/CN2023/131088, filed on Nov. 10, 2023.

(30) Foreign Application Priority Data

May 23, 2023 (CN) .......................... 202310588646.5

(51) Int. Cl.
F03D 7/02 (2006.01)
F03D 9/25 (2016.01)

(52) U.S. Cl.
CPC ............. *F03D 7/0204* (2013.01); *F03D 9/25* (2016.05); *F05B 2220/706* (2013.01); *F05B 2270/32* (2013.01)

(58) Field of Classification Search
CPC .... F03D 7/0204; F03D 9/25; F05B 2220/706; F05B 2270/32
See application file for complete search history.

(56) References Cited

U.S. PATENT DOCUMENTS

2014/0203562 A1* 7/2014 Black ...................... F03D 7/043 290/44
2023/0012218 A1* 1/2023 Ai ........................... F03D 17/00

FOREIGN PATENT DOCUMENTS

CN 106150904 A 11/2016
CN 107781108 A 3/2018
(Continued)

OTHER PUBLICATIONS

Beijing Intellectual Property Office, "International Search Report" in Application No. PCT/ CN2023/131088, Feb. 1, 2024, 17 pages.

*Primary Examiner* — Audrey B. Walter
(74) *Attorney, Agent, or Firm* — Davis Wright Tremaine LLP

(57) ABSTRACT

The yaw control system may obtain time series data of a wind turbine generator set in response to a strategy adjustment request, the time series data of the wind turbine generator set comprising time series data for a wind facing angle; determine a generator set operating duration corre-
(Continued)

sponding to each wind facing angle according to the time series data of the wind facing angle; determine a data distribution characteristic of the generator set operating duration corresponding to the wind facing angle according to generator set operating durations corresponding to multiple wind facing angles; and when identifying that the data distribution characteristic of the generator set operating duration corresponding to the wind facing angle meets a corresponding strategy adjustment condition, adjust a yaw control strategy, to perform yaw control on the wind turbine generator set according to an adjusted yaw control strategy.

20 Claims, 6 Drawing Sheets

(56) References Cited

FOREIGN PATENT DOCUMENTS

| | | |
|---|---|---|
| CN | 108869176 A | 11/2018 |
| CN | 110273813 A | 9/2019 |
| CN | 110318947 A | 10/2019 |
| CN | 111120221 A | 5/2020 |
| CN | 113027675 A | 6/2021 |
| CN | 113107770 A | 7/2021 |
| CN | 116696669 A | 9/2023 |
| WO | 2023040141 A1 | 3/2023 |

\* cited by examiner

ADJUSTING METHOD OF YAW CONTROL STRATEGY, YAW CONTROL SYSTEM AND MEDIUM

CROSS-REFERENCE TO RELATED APPLICATION

The present application is a continuation of International Application No. PCT/CN2023/131088, filed on Nov. 10, 2023, which claims priority to Chinese Patent Application No. 202310588646.5, filed on May 23, 2023, entitled "ADJUSTING METHOD OF YAW CONTROL STRATEGY, YAW CONTROL SYSTEM AND MEDIUM." The applications are hereby incorporated by reference in their entireties.

TECHNICAL FIELD

The present application relates to a technical field of wind power generation, and in particular to an adjusting method of a yaw control strategy, a yaw control system and a medium.

BACKGROUND

Wind energy, as a clean and renewable energy source, is increasingly receiving attention from countries around the world. The efficient utilization of wind energy depends on the efficient tracking of wind direction by a wind turbine generator set. The yaw control system is an important component for achieving fast and accurate facing wind of the wind turbine generator set to reduce the wind energy loss.

In the related art, the yaw control system may perform yaw control on the wind turbine generator set based on a fixed yaw control strategy, so as to control the wind turbine generator set to yaw when the wind facing angle (an angle between the current wind direction captured by a wind vane and a center axis of nacelle of the generator set) is detected to reach a preset yaw initiation angle, so that the wind turbine generator set can absorb wind energy to a maximum extent.

However, in the related art, the yaw control of the wind turbine generator set can be only based on a fixed yaw control strategy, and there is situation where the yaw control strategy is set improperly, resulting in poor yaw control effect, and in turn resulting in low wind energy utilization rate.

SUMMARY

Embodiments of the present application provide an adjusting method of a yaw control strategy, a yaw control system and medium, to solve the problem that, in the prior art, the yaw control of a wind turbine generator set can be only based on a fixed yaw control strategy and has a poor yaw control effect due to unreasonable setting of the yaw control strategy.

In a first aspect, an embodiment of the present application provides an adjusting method of a yaw control strategy, applied to a yaw control system, including:
  obtaining time series data of a wind turbine generator set in response to a strategy adjustment request; wherein the time series data of the wind turbine generator set comprises time series data of a wind facing angle;
  determining a generator set operating duration corresponding to each wind facing angle according to the time series data of the wind facing angle;
  determining a data distribution characteristic of the generator set operating duration corresponding to the wind facing angle according to the generator set operating durations corresponding to multiple wind facing angles; and
  adjusting the yaw control strategy when identifying that the data distribution characteristic of the generator set operating duration corresponding to the wind facing angle meets a corresponding strategy adjustment condition, to perform yaw control on the wind turbine generator set according to the adjusted yaw control strategy.

In an implementation, the determining the data distribution characteristic of the generator set operating duration corresponding to the wind facing angle according to generator set operating durations corresponding to the multiple wind facing angles includes:
  performing Gaussian distribution fitting on the generator set operating durations corresponding to the multiple wind facing angles, to determinate a Gaussian distribution standard deviation; and
  when identifying that the Gaussian distribution standard deviation is greater than a preset standard deviation, adjusting a preset yaw wait duration and a preset yaw stop delay duration in the yaw control strategy.

In an implementation, the determining the data distribution characteristic of the generator set operating duration corresponding to the wind facing angle according to generator set operating durations corresponding to multiple wind facing angles includes:
  comparing the generator set operating duration corresponding to each wind facing angle, to determine a maximum generator set operating duration in the generator set operating durations corresponding to the multiple wind facing angles, and determining the wind facing angle corresponding to the maximum generator set operating duration as a wind facing angle center value;
  then, the adjusting the yaw control strategy when identifying that the data distribution characteristic of the generator set operating duration corresponding to the wind facing angle meets the corresponding strategy adjustment condition includes:
  adjusting a preset yaw initiation angle, a preset yaw stop angle, a preset yaw wait duration, and a preset yaw stop delay duration in the yaw control strategy when identifying that the wind facing angle center value is greater than a preset first angle threshold.

In an implementation, the determining the data distribution characteristic of the generator set operating duration corresponding to the wind facing angle according to generator set operating durations corresponding to the multiple wind facing angles, further includes:
  determining a distribution unbalance degree of the wind facing angle according to the generator set operating durations corresponding to the multiple wind facing angles;
  then, the adjusting the yaw control strategy when identifying that the data distribution characteristic of the generator set operating duration corresponding to the wind facing angle meets the corresponding strategy adjustment condition, further includes:
  identifying whether the distribution unbalance degree of the wind facing angle is greater than a preset unbalance degree threshold when identifying that the wind facing angle center value is less than or equal to the preset first angle threshold; and adjusting the preset yaw wait duration in the yaw control strategy when identifying that the distribution unbalance degree of the wind facing angle is greater than the preset unbalance degree threshold.

In an implementation, the determining the distribution unbalance degree of the wind facing angle according to the generator set operating durations corresponding to the multiple wind facing angles includes:

according to the generator set operating durations corresponding to the multiple wind facing angles, determining the generator set operating duration corresponding to each wind facing angle greater than a preset second angle threshold, and determining generator set operating duration corresponding to each wind facing angle less than the preset second angle threshold;

determining a first total generator set operating duration according to generator set operating durations corresponding to the multiple wind facing angles greater than the preset second angle threshold;

determining a second total generator set operating duration according to generator set operating durations corresponding to the multiple wind facing angles less than the preset second angle threshold; and determining the distribution unbalance degree of the wind facing angle according to the first total generator set operating duration and the second total generator set operating duration.

In an implementation, the time series data of the wind turbine generator set further includes time series data of wind speed; the time series data of the wind speed corresponds to the time series data of the wind facing angle; the method further includes:

in the time series data of the wind facing angle, determining time series data of a wind facing angle corresponding to wind speed less than a preset high and low wind speed boundary threshold as the time series data of the wind facing angle at a low wind speed, and determining time series data of the wind facing angle corresponding to wind speed greater than or equal to the preset high and low wind speed boundary threshold as the time series data of the wind facing angle at a high wind speed;

then, the determining the generator set operating duration corresponding to each wind facing angle according to the time series data of the wind facing angle includes:

determining the generator set operating duration corresponding to each wind facing angle at the low wind speed according to the time series data of the wind facing angle at the low wind speed;

determining the generator set operating duration corresponding to each wind facing angle at the high wind speed according to the time series data of the wind facing angle at the high wind speed;

then, the determining the data distribution characteristic of the generator set operating duration corresponding to the wind facing angle according to generator set operating durations corresponding to the multiple wind facing angles includes: determining the data distribution characteristic of the generator set operating duration corresponding to the wind facing angle at the low wind speed according to the generator set operating durations corresponding to the multiple wind facing angles at the low wind speed;

determining the data distribution characteristic of the generator set operating duration corresponding to the wind facing angle at the high wind speed according to the generator set operating durations corresponding to the multiple wind facing angles at the high wind speed;

then, the adjusting the yaw control strategy when identifying that the data distribution characteristic of the generator set operating duration corresponding to the wind facing angle meets the corresponding strategy adjustment condition, includes:

when identifying that the data distribution characteristic of the generator set operating duration corresponding to the wind facing angle at the low wind speed meets a corresponding low wind speed strategy adjustment condition, adjusting a low wind speed yaw control strategy; and when identifying that the data distribution characteristic of the generator set operating duration corresponding to the wind facing angle at the high wind speed meets a corresponding high wind speed strategy adjustment condition, adjusting a high wind speed yaw control strategy.

In an implementation, the time series data of the wind turbine generator set further includes time series data of a wind turbine generator state; the time series data of the wind turbine generator state corresponds to the time series data of the wind facing angle; the method further includes:

in the time series data of the wind facing angle, determining the time series data of the wind facing angle corresponding to the wind turbine generator state being a power generation state, as time series data of a filtered wind facing angle; then, the determining the generator set operating duration corresponding to each wind facing angle according to the time series data of the wind facing angle includes:

determining the generator set operating duration corresponding to each filtered wind facing angle according to the time series data of the filtered wind facing angle;

then, the determining the data distribution characteristic of the generator set operating duration corresponding to the wind facing angle according to generator set operating durations corresponding to the multiple wind facing angles includes:

determining the data distribution characteristic of the generator set operating duration corresponding to the wind facing angle according to the generator set operating durations corresponding to multiple filtered wind facing angles.

In a second aspect, an embodiment of the present application provides a yaw control system, including:

an obtaining module, configured to obtain time series data of a wind turbine generator set in response to a strategy adjustment request; wherein the time series data of the wind turbine generator set includes time series data for a wind facing angle;

a processing module, configured to determine a generator set operating duration corresponding to each wind facing angle according to the time series data of the wind facing angle;

the processing module is further configured to determine a data distribution characteristic of the generator set operating duration corresponding to the wind facing angle according to generator set operating durations corresponding to multiple wind facing angles; and the processing module is further configured to, when identifying that the data distribution characteristic of the generator set operating duration corresponding to the wind facing angle meets a corresponding strategy adjustment condition, adjust a yaw control strategy to perform yaw control on the wind turbine generator set according to the adjusted yaw control strategy.

In an implementation, the processing module is specifically configured to:

perform Gaussian distribution fitting on the generator set operating durations corresponding to the multiple wind facing angles, to determine a Gaussian distribution standard deviation; and when identifying that the Gaussian distribution standard deviation is greater than a preset standard deviation, adjust a preset yaw wait duration and a preset yaw stop delay duration in the yaw control strategy.

In an implementation, the processing module is specifically configured to:

compare the generator set operating duration corresponding to each wind facing angle, to determine a maximum generator set operating duration in the generator set operating durations corresponding to the multiple wind facing angles, and determine the wind facing angle corresponding to the maximum generator set operating duration as a wind facing angle center value; and adjust a preset yaw initiation angle, a preset yaw stop angle, a preset yaw wait duration, and a preset yaw stop delay duration in the yaw control strategy when identifying that the wind facing angle center value is greater than a preset first angle threshold.

In an implementation, the processing module is further configured to:

determine a distribution unbalance degree of the wind facing angle according to the generator set operating durations corresponding to the multiple wind facing angles;

identify whether the distribution unbalance degree of the wind facing angle is greater than a preset unbalance degree threshold when identifying that the wind facing angle center value is less than or equal to the preset first angle threshold; and adjust the preset yaw wait duration in the yaw control strategy when identifying that the distribution unbalance degree of the wind facing angle is greater than the preset unbalance degree threshold.

In an implementation, the processing module is specifically configured to:

according to the generator set operating durations corresponding to the multiple wind facing angles, determine the generator set operating duration corresponding to each wind facing angle greater than a preset second angle threshold, and determine the generator set operating duration corresponding to each wind facing angle less than the preset second angle threshold;

determine a first total generator set operating duration according to generator set operating durations corresponding to the multiple wind facing angles greater than the preset second angle threshold;

determine a second total generator set operating duration according to generator set operating durations corresponding to the multiple wind facing angles less than the preset second angle threshold; and determine the distribution unbalance degree of the wind facing angle according to the first total generator set operating duration and the second total generator set operating duration.

In an implementation, the time series data of the wind turbine generator set further includes time series data of wind speed; the time series data of the wind speed corresponds to the time series data of the wind facing angle; the processing module is further configured to:

in the time series data of the wind facing angle, determine the time series data of the wind facing angle corresponding to the wind speed less than a preset high and low wind speed boundary threshold as the time series data of the wind facing angle at a low wind speed, and determine the time series data of the wind facing angle corresponding to the wind speed greater than or equal to the preset high and low wind speed boundary threshold as the time series data of the wind facing angle at a high wind speed;

determine the generator set operating duration corresponding to each wind facing angle at a low wind speed according to the time series data of the wind facing angle at the low wind speed;

determine the generator set operating duration corresponding to each wind facing angle at the high wind speed according to the time series data of the wind facing angle at the high wind speed;

determine the data distribution characteristic of the generator set operating duration corresponding to the wind facing angle at the low wind speed according to the generator set operating durations corresponding to the multiple wind facing angles at the low wind speed;

determine a data distribution characteristic of the generator set operating duration corresponding to the wind facing angle at the high wind speed according to the generator set operating durations corresponding to the multiple wind facing angles at the high wind speed;

when identifying that the data distribution characteristic of the generator set operating duration corresponding to the wind facing angle at the low wind speed meets a corresponding low wind speed strategy adjustment condition, adjust a low wind speed yaw control strategy; and when identifying that the data distribution characteristic of the generator set operating duration corresponding to the wind facing angle at the high wind speed meets a corresponding high wind speed strategy adjustment condition, adjust a high wind speed yaw control strategy.

In an implementation, the time series data of the wind turbine generator set further includes time series data of a wind turbine generator state; the time series data of the wind turbine generator state corresponds to the time series data of the wind facing angle; the processing module is further configured to:

in the time series data of the wind facing angle, determine the time series data of the wind facing angle corresponding to the wind turbine generator state being a power generation state, as time series data of a filtered wind facing angle;

determine the generator set operating duration corresponding to each filtered wind facing angle according to the time series data of the filtered wind facing angle; and determine the data distribution characteristic of the generator set operating duration corresponding to the wind facing angle according to generator set operating durations corresponding to multiple filtered wind facing angles.

In a third aspect, an embodiment of the present application provides a yaw control system, including: a processor, and a memory communicatively connected to the processor; the memory stores computer executable instructions;

the processor executes the computer executable instructions stored in the memory to implement the adjusting method of the yaw control strategy described in the first aspect.

In a fourth aspect, an embodiment of the present application provides a computer readable storage medium, wherein the computer readable storage medium stores computer executable instructions, which, when being executed by a processor, is used to implement the adjusting method of the yaw control strategy according to described in the first aspect.

Embodiments of the present application provides an adjusting method of a yaw control strategy, a yaw control system and a medium, and in the method, based on the data distribution characteristic of the generator set operating duration corresponding to the wind facing angle, the wind facing situation of the wind turbine generator set under the control of the yaw control system may be reflected, that is to say, based on the data distribution characteristic of the generator set operating duration corresponding to the wind facing angle, the control situation of the current yaw control strategy can be reflected, the yaw control system may determine the generator set operating duration corresponding to each wind facing angle according to the time series data of the wind facing angle, and thus determine the data distribution characteristic of the generator set operating duration corresponding to the wind facing angle. When the yaw control system identifies that the data distribution characteristic meets the corresponding strategy adjustment condition, that is, when identifying that the wind facing condition of the wind turbine generator set under the control of the yaw control system does not meet the requirement, it is determined that the current yaw control strategy has a poor yaw control effect. The yaw control system may adjust the yaw control strategy, so as to improve the subsequent effect that the yaw control system controls the wind turbine generator set to yaw according to the adjusted yaw control strategy. By the above-mentioned manner, the problem that in the prior art, the yaw control of a wind turbine generator set can be based on only a fixed yaw control strategy, and has a poor yaw control effect due to unreasonable setting of the yaw control strategy.

BRIEF DESCRIPTION OF DRAWINGS

In order to more clearly illustrate the technical solutions in the embodiments of the present application or in the related technology, the following will briefly introduce the accompanying drawings that need to be used in the description of the embodiments or the related technology, and it will be obvious that the accompanying drawings in the following description are some of the embodiments of the present application, and for an ordinary person skilled in the art, other accompanying drawings can be obtained based on these accompanying drawings without paying for creative labor.

DESCRIPTION OF EMBODIMENTS

Figure 1:
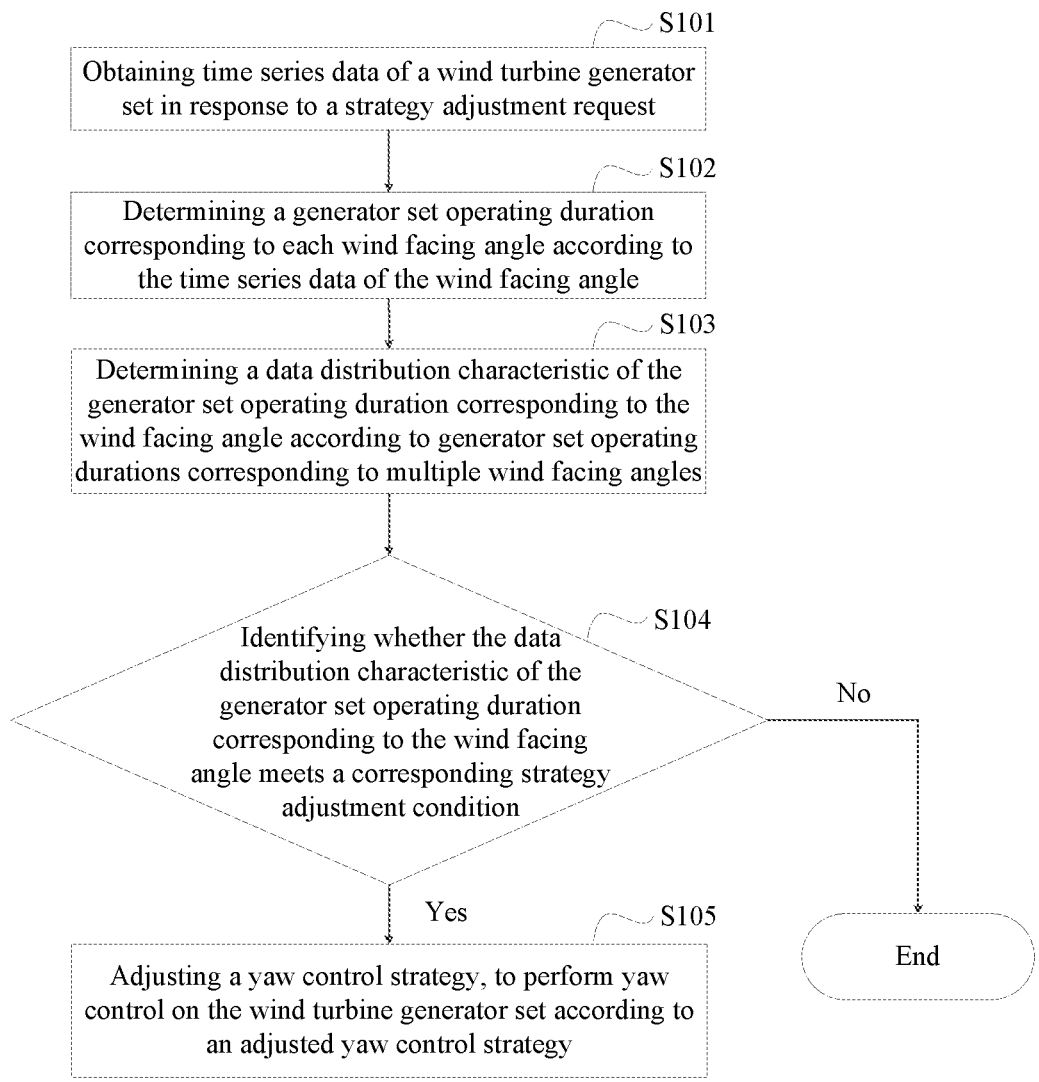
FIG. 1 is a schematic flowchart of Embodiment 1 of an adjusting method of a yaw control strategy provided by an embodiment of the present application.

In order to make purposes, technical solutions and advantages of the embodiments of the present application clearer, the technical solutions in the embodiments of the present application will be described clearly and completely in the following in conjunction with the accompanying drawings in the embodiments of the present application, and it is obvious that the described embodiments are a part of the embodiments of the present application and not all of the embodiments. Based on the embodiments in the present application, all other embodiments made by an ordinary person skilled in the art under the inspiration of the embodiments fall within the protection scope of the present application.

The terms "first", "second", "third", "fourth", etc. (if any) in the specification and claims of the present application, as well as the accompanying drawings described above, are used to distinguish similar objects but not to describe a particular order or sequence. It should be understood that the data used in this way may be interchanged in appropriate circumstances, so that the embodiments described herein may be implemented in an order other than those illustrated or described herein. In addition, the terms "includes" and "has", and any variations thereof, are intended to cover non-exclusive inclusions, e.g., a process, method, system, product or device that includes a series of steps or units does not need to be limited to those that are clearly listed, but may include other steps or units that are not clearly listed or are inherent to the process, method, product or device.

In the prior art, the yaw control system may perform yaw control on the wind turbine generator set based on a fixed yaw control strategy, so that the wind turbine generator set is controlled to yaw when a wind facing angle (an angle between a current wind direction captured by a wind vane and a center axis of nacelle of the generator set) is detected to reach a preset yaw initiation angle, so as to adjust the wind facing angle, and thus, the wind turbine generator set can absorb wind energy to the maximum extent. However, in the prior art, the yaw control of the wind turbine generator set can be based on only a fixed yaw control strategy, and there is situation where the yaw control strategy is set improperly, resulting in poor yaw control effect of the wind turbine generator set performing the yaw control based on yaw control strategy, and thus resulting in low wind energy utilization rate.

Based on the above technical problem, embodiments of the present application provide an adjusting method of a yaw control strategy, which method can determine a data distribution characteristic of generator set operating duration corresponding to the wind facing angle based on time series data of the wind facing angle, and when identifying that the data distribution characteristic meets a strategy adjustment condition, adjust a yaw control strategy to ensure that the yaw control system may subsequently perform yaw control on the wind turbine generator set according to the adjusted yaw control strategy, so as to improve the yaw control effect.

In the following, the technical solutions of the present application are described in detail by means of specific embodiments. It is noted that these following specific embodiments may be combined with each other, and the same or similar concepts or processes may not be repeated in certain embodiments.

FIG. 1 is a schematic flowchart of Embodiment 1 of an adjusting method of a yaw control strategy provided by an embodiment of the present application. Referring to FIG. 1, the method specifically includes the following steps.

S101: obtaining time series data of a wind turbine generator set in response to a strategy adjustment request.

In the embodiment, the wind turbine generator may sample during operation based on a preset sampling frequency. In an implementation, a monitoring system of the wind turbine generator set may sample based on the preset sampling frequency. Exemplarily, the preset sampling frequency may be 0.1 Hz, that is to say, the sampling interval may be 10 seconds.

The wind turbine generator set may collect the wind facing angle (or wind direction value) to obtain the time series data of the wind facing angle during each sampling. In an implementation, the wind turbine generator set may also collect any one or more of wind speed, wind turbine generator state, power, rotational speed, and blade angle during each sampling.

The wind turbine generator set may determine the time series data of the wind turbine generator set based on the data collected during each sampling and store it for processing.

The yaw control system of the wind turbine generator set may obtain the time series data of the wind turbine generator set in response to the received strategy adjustment request. Where the time series data of the wind turbine generator set may include time series data of the wind facing angle.

It should be noted that in the case where the data collected by the wind turbine generator set includes a wind direction value, that is to say, in the case where the time series data of the wind turbine generator set includes time series data of the wind direction value, the yaw control system may convert the time series data of the wind direction value to the time series data of the wind facing angle. Specifically, the yaw control system may subtract 180° from the collected wind direction value during each sampling to convert the time series data of the wind direction value into the time series data of the wind facing angle.

S102: determining a generator set operating duration corresponding to each wind facing angle according to the time series data of the wind facing angle.

In the embodiment, the yaw control system may determine generator set operating duration corresponding to each wind facing angle according to the time series data of the wind facing angle after obtaining the time series data of the wind facing angle.

Specifically, for the time series data of the wind facing angle, the yaw control system may determine a maximum value of the wind facing angle and a minimum value of the wind facing angle, and determine one wind facing angle every set interval angle (such as 0.1 degrees). Exemplarily, the maximum value of the wind facing angle is 50°, and the minimum value of the wind facing angle is −50°, the yaw control system may determine one wind facing angle every 0.10 interval, and thus determine 1001 wind facing angles. Exemplarily, the maximum value of the wind facing angle is 40°, and the minimum value of the wind facing angle is −40°, the yaw control system may determine one wind facing angle every 10 interval, and thus determine 81 wind facing angles.

The yaw control system may, according to the time series data of the wind facing angle, determine a total operating duration of the wind turbine generator set at each wind facing angle, and thus determine a generator set operating duration corresponding to each wind facing angle.

S103: determining a data distribution characteristic of the generator set operating duration corresponding to the wind facing angle according to generator set operating durations corresponding to multiple wind facing angles.

In the embodiment, the yaw control system may determine a data distribution characteristic of the generator set operating duration of the wind facing angle according to generator set operating durations corresponding to multiple wind facing angles, after determining the generator set operating duration corresponding to each wind facing angle.

In an implementation, the yaw control system may perform a Gaussian distribution fitting on the generator set operating durations corresponding to the multiple wind facing angles, to determine a Gaussian distribution standard deviation, and take the Gaussian distribution standard deviation as the data distribution characteristic of the generator set operating duration corresponding to the wind facing angle.

In an implementation, the yaw control system may compare the generator set operating duration corresponding to each wind facing angle, to determine a maximum generator set operating duration in the generator set operating durations corresponding to the multiple wind facing angles, and determine the wind facing angle corresponding to the maximum generator set operating duration as a wind facing angle center value. The yaw control system may take the wind facing angle center value as the data distribution characteristic of the generator set operating duration corresponding to the wind facing angle, after determining the wind facing angle center value.

In an implementation, the yaw control system may determine a distribution unbalance degree of the wind facing angle according to the generator set operating durations corresponding to the multiple wind facing angles, and take the distribution unbalance degree of the wind facing angle as the data distribution characteristic of the generator set operating duration corresponding to the wind facing angle.

In an implementation, on the basis that the time series data of the wind turbine generator set further includes time series data of a wind turbine generator state and the time series data of the wind turbine generator state corresponds to the time series data of the wind facing angle, the yaw control system may further determine the time series data of the wind facing angle corresponding to the wind turbine generator state being a power generation state, as time series data of a filtered wind facing angle. The yaw control system may determine generator set operating duration corresponding to each filtered wind facing angle according to the time series data of the filtered wind facing angle, and determine the data distribution characteristic of the generator set operating duration corresponding to the wind facing angle according to generator set operating durations corresponding to multiple filtered wind facing angles.

S104: identifying whether the data distribution characteristic of the generator set operating duration corresponding to the wind facing angle meets a corresponding strategy adjustment condition.

In the embodiment, the yaw control system may identify whether the data distribution characteristic of the generator set operating duration corresponding to the wind facing angle meets a corresponding strategy adjustment condition.

When identifying that the data distribution characteristic of the generator set operating duration corresponding to the wind facing angle meets the corresponding strategy adjustment condition, it is determined that the current yaw control effect is poor and the yaw control strategy needs to be adjusted to improve subsequent yaw control effect, i.e., it is necessary to perform S105; when identifying that the data distribution characteristic of the generator set operating duration corresponding to the wind facing angle does not meet the corresponding strategy adjustment condition, it is determined that the current yaw control effect is good and the yaw control strategy does not need to be adjusted, then it is ended.

S105, adjusting a yaw control strategy to perform yaw control on the wind turbine generator set according to the adjusted yaw control strategy.

In the embodiment, when the yaw control system identifies that the data distribution characteristic of the generator set operating duration corresponding to the wind facing angle meets the corresponding strategy adjustment condition, it adjusts the yaw control strategy, to perform yaw control on the wind turbine generator set according to the adjusted yaw control strategy.

Specifically, when performing yaw control on the wind turbine generator set according to the adjusted yaw control strategy, the yaw control system may monitor and obtain the wind facing angle (an angle between a current wind direction captured by a wind vane and a center axis of nacelle of the generator set). The yaw control system starts timing when it identifies that the wind facing angle reaches a preset yaw initiation angle, and controls the wind turbine generator set to yaw when it identifies that the duration that the wind facing angle reaches the preset yaw initiation angle reaches a preset yaw wait duration. When the yaw control system identifies that the wind facing angle after yaw reaches a preset yaw stop angle, it starts timing. When identifying that the wind facing angle is always less than or equal to the preset yaw stop angle within a preset yaw stop delay duration, the yaw control system stops yaw.

When identifying that the data distribution characteristic of the generator set operating duration corresponding to the wind facing angle meets a corresponding strategy adjustment condition, the yaw control system may adjust the preset yaw initiation angle, the preset yaw stop angle, the preset yaw wait duration, and/or the preset yaw stop delay duration in the yaw control strategy to perform yaw control on the wind turbine generator set according to the adjusted yaw control strategy.

In an implementation, after adjusting the yaw control strategy, the yaw control system may record an adjustment number, and perform alarm processing when identifying that the adjustment number reaches a preset adjustment number threshold within a preset time range.

In the embodiment, the data distribution characteristic of the generator set operating duration corresponding to the wind facing angle may reflect a wind facing situation of the wind turbine generator set under the control of the yaw control system, that is to say, it reflects the control situation of the current yaw control strategy. The yaw control system may determine the generator set operating duration corresponding to each wind facing angle according to the time series data of the wind facing angle, and determine the data distribution characteristic of the generator set operating duration corresponding to the wind facing angle according to the generator set operating durations corresponding to multiple wind facing angles. When the yaw control system identifies that the data distribution characteristic meets the corresponding strategy adjustment condition, that is to say, when it identifies that a wind facing condition of the wind turbine generator set under the control of the yaw control system does not meet the requirement, it is determined that the yaw control effect of the current yaw control strategy is poor. The yaw control system may adjust the yaw control strategy, so as to improve the subsequent yaw control effect. By the above-mentioned manner, solving the problem that in the prior art, the yaw control of a wind turbine generator set can be based on only a fixed yaw control strategy and the yaw control strategy is set improperly, resulting in poor yaw control effect.

By Embodiment 2 of the method, the following is a detailed description of a process of adjusting the yaw control strategy when identifying that the data distribution characteristic (Gaussian distribution standard deviation) of the generator set operating duration corresponding to the wind facing angle meets the corresponding strategy adjustment condition.

Figure 2:
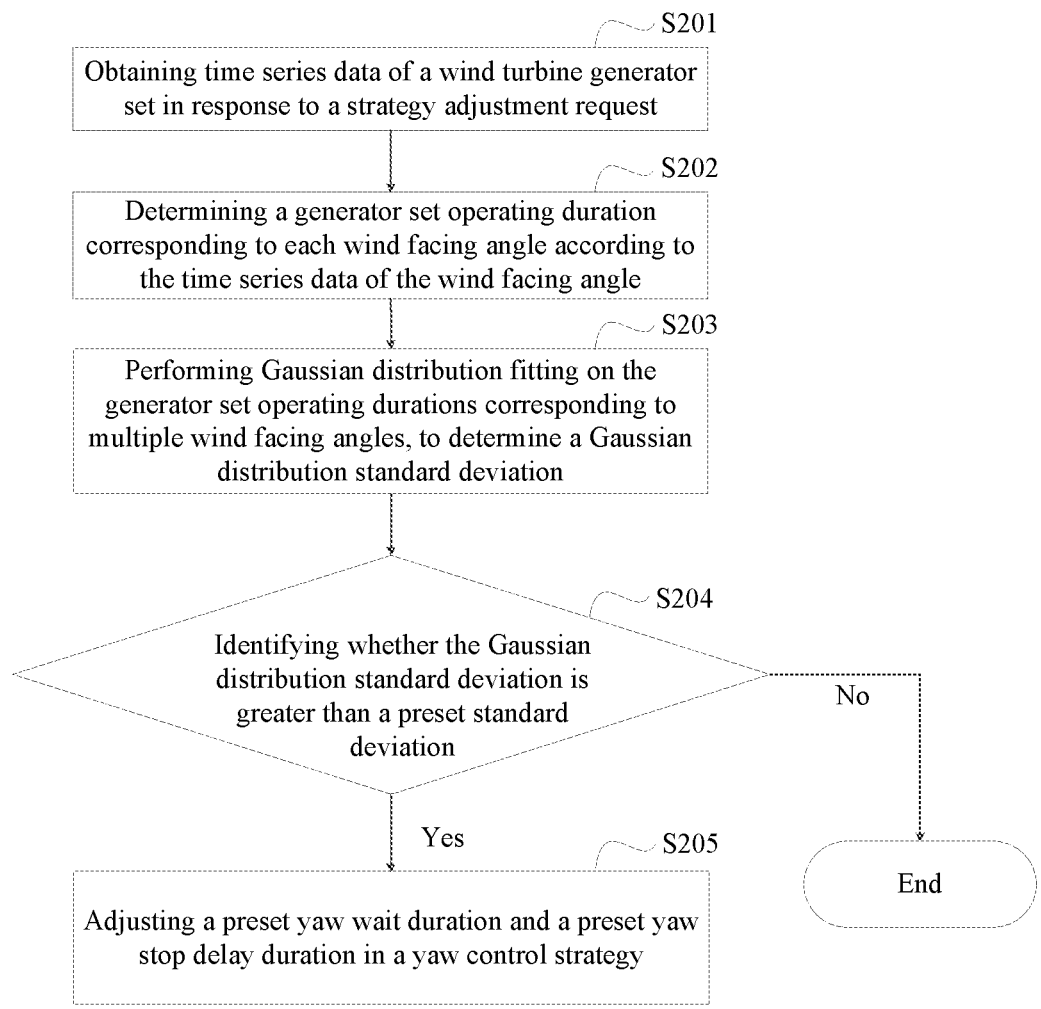
FIG. 2 is a schematic flowchart of Embodiment 2 of an adjusting method of a yaw control strategy provided by an embodiment of the present application.

FIG. 2 is a schematic flowchart of Embodiment 2 of an adjusting method of a yaw control strategy provided by an embodiment of the present application. Referring to FIG. 2, the method specifically includes the following steps.

S201: obtaining time series data of a wind turbine generator set in response to a strategy adjustment request.

In the embodiment, the yaw control system may obtain the time series data of the wind turbine generator set in response to the strategy adjustment request. Where the time series data of the wind turbine generator set includes time series data for a wind facing angle.

S202: determining a generator set operating duration corresponding to each wind facing angle according to the time series data of the wind facing angle.

S203, performing Gaussian distribution fitting on the generator set operating durations corresponding to multiple wind facing angles, to determine a Gaussian distribution standard deviation.

In the embodiment, the yaw control system may perform Gaussian distribution fitting on the generator set operating durations corresponding to multiple wind facing angles by using the following formula:

$$y=a*e^{(-((x-b)^2)}$$

where x is the wind facing angle, y is the generator set operating duration, and a, b, and c are parameters of the Gaussian distribution.

The yaw control system may determine a Gaussian distribution standard deviation after performing Gaussian distribution fitting on the generator set operating durations corresponding to the multiple wind facing angles.

S204: identifying whether the Gaussian distribution standard deviation is greater than a preset standard deviation.

In the embodiment, the yaw control system may identify whether the Gaussian distribution standard deviation is greater than a preset standard deviation.

When the yaw control system identifies that the Gaussian distribution standard deviation is greater than the preset standard deviation, it performs S105; when the yaw control system identifies that the Gaussian distribution standard deviation is less than or equal to the preset standard deviation, it ends.

In an implementation, the preset standard deviation may be an average of a Gaussian distribution standard deviation corresponding to multiple other wind turbine generator sets.

S205: adjusting a preset yaw wait duration and a preset yaw stop delay duration in the yaw control strategy.

In the embodiment, when the yaw control system identifies that the Gaussian distribution standard deviation is greater than the preset standard deviation, it is determined that an angle range of the wind facing angle of the wind turbine generator set is relatively large, that is to say, the yaw control system is not timely in adjustment of the wind facing angle of the wind turbine generator set. At this time, it is determined that the yaw control system needs to adjust the yaw control strategy, so that the yaw control system can cause the wind facing angle of the wind turbine generator set to be reduced when performing yaw control on the wind turbine generator set according to the adjusted yaw control strategy.

Specifically, the yaw control system may adjust the preset yaw wait duration and the preset yaw stop delay duration in the yaw control strategy, so as to obtain an adjusted preset yaw wait duration and an adjusted preset yaw stop delay duration. In an implementation, the yaw control system may control the preset yaw wait duration to decrease and the preset yaw stop delay duration to increase.

The yaw control system may monitor and obtain the wind facing angle during yaw control. When identifying that the wind facing angle reaches a preset yaw initiation angle, the yaw control system starts timing, and when identifying that the duration when the wind facing angle reaches the preset yaw initiation angle reaches a preset yaw wait duration, the yaw control system controls the wind turbine generator set to yaw, so as to gradually reduce the wind facing angle.

When identifying that the wind facing angle after yaw reaches a preset yaw stop angle, the yaw control system starts timing. When identifying that the duration when the wind facing angle reaches the preset yaw stop angle reaches an adjusted preset yaw stop delay duration, the yaw control system controls the wind turbine generator set to stop yaw.

In the embodiment, when the yaw control system identifies that the Gaussian distribution standard deviation of the generator set operating duration corresponding to the wind facing angle is greater than the preset standard deviation, it is determined that the distribution of the wind facing angle is relatively dispersed, and a difference between the maximum value of the wind facing angle and the minimum value of the wind facing angle is relatively large, that is to say, under the yaw control of the yaw control system, the absolute value of the wind facing angle of the wind turbine generator set is still large, and the yaw control effect of the yaw control strategy is poor. The yaw control system may adjust the preset yaw wait duration and the preset yaw stop delay duration. On one hand, adjusting the preset yaw wait duration may avoid the situation where real-time tracking of a wind direction change cannot be realized due to a low yaw action of the wind turbine generator set, thereby improving the yaw control effect. On the other hand, adjusting the preset yaw wait duration may avoid the situation where the wind turbine generator set stops yaw when determining that the wind facing angle reaches a preset yaw stop angle within a short time range and thus yaw control effect is poor due to rapid increase of the wind facing angle after stopping yaw.

By Embodiment 3 of the method, the following is a detailed description of a process of adjusting the yaw control strategy when identifying that the data distribution characteristic (wind facing angle center value) of the generator set operating duration corresponding to the wind facing angle meets the corresponding strategy adjustment condition.

Figure 3:
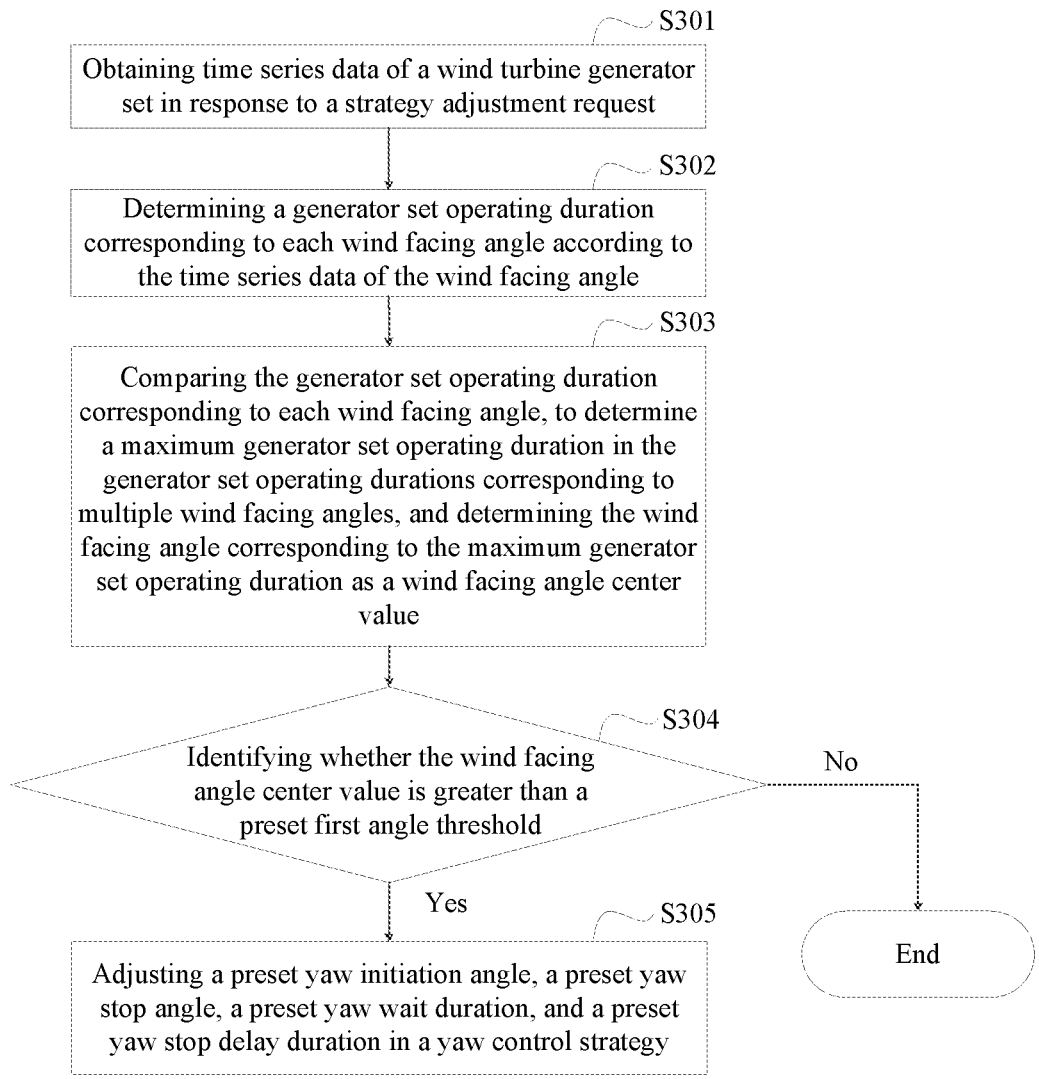
FIG. 3 is a schematic flowchart of Embodiment 3 of an adjusting method of a yaw control strategy provided by an embodiment of the present application.

FIG. 3 is a schematic flowchart of Embodiment 3 of an adjusting method of a yaw control strategy provided by an embodiment of the present application. Referring to FIG. 3, the method specifically includes the following steps.

S301: obtaining time series data of a wind turbine generator set in response to a strategy adjustment request.

In the embodiment, the yaw control system may obtain the time series data of the wind turbine generator set in response to the strategy adjustment request. Where the time series data of the wind turbine generator set includes time series data of a wind facing angle.

S302: determining a generator set operating duration corresponding to each wind facing angle according to the time series data of the wind facing angle.

S303: comparing the generator set operating duration corresponding to each wind facing angle, to determine a maximum generator set operating duration in the generator set operating durations corresponding to multiple wind facing angles, and determining the wind facing angle corresponding to the maximum generator set operating duration as a wind facing angle center value.

In the embodiment, the yaw control system may compare the generator set operating duration corresponding to each wind facing angle, to determine a maximum generator set operating duration in the generator set operating durations corresponding to multiple wind facing angles, and determine the wind facing angle corresponding to the maximum generator set operating duration as a wind facing angle center value.

S304: identifying whether the wind facing angle center value is greater than a preset first angle threshold.

In the embodiment, the yaw control system may identify whether the wind facing angle center value is greater than a preset first angle threshold. Exemplarily, the preset first angle threshold may be 2°.

When the yaw control system identifies that the wind facing angle center value is greater than the preset first angle threshold, it performs S305; when the yaw control system identifies that the wind facing angle center value is less than or equal to the preset first angle threshold, it ends.

S305: adjusting a preset yaw initiation angle, a preset yaw stop angle, a preset yaw wait duration, and a preset yaw stop delay duration in the yaw control strategy.

In the embodiment, when the yaw control system identifies that the wind facing angle center value is greater than the preset first angle threshold, it is determined that the yaw control system has a small degree of adjustment for the wind facing angle of the wind turbine generator set. At this time, it is determined that the yaw control system needs to adjust the yaw control strategy, so that the yaw control system can cause the wind facing angle of the wind turbine generator set to be reduced when performing yaw control on the wind turbine generator set according to the adjusted yaw control strategy.

Specifically, the yaw control system may adjust the preset yaw initiation angle, the preset yaw stop angle, the preset yaw wait duration and the preset yaw stop delay duration in the yaw control strategy, so as to obtain an adjusted preset yaw initiation angle, an adjusted preset yaw stop angle, an adjusted preset yaw wait duration and an adjusted preset yaw stop delay duration. In an implementation, the yaw control system may control the preset yaw initiation angle to decrease and the preset yaw stop angle to decrease, the preset yaw wait duration to decrease and the preset yaw stop delay duration to increase. By the above-mentioned manner, the yaw control effect may be improved to reduce the wind facing angle of the wind turbine generator set.

In the process that the yaw control system performs yaw control on the wind turbine generator set according to the adjusted yaw control strategy:

The yaw control system may monitor and obtain the wind facing angle. When identifying that the wind facing angle reaches a preset yaw initiation angle, the yaw control system starts timing, and when identifying that the duration when the wind facing angle reaches the adjusted preset yaw initiation angle reaches the adjusted preset yaw wait duration, the yaw control system controls the wind turbine generator set to yaw, so as to gradually reduce the wind facing angle.

When identifying that the wind facing angle reaches the adjusted preset yaw stop angle, the yaw control system starts timing. When identifying that the wind facing angle is always less than or equal to the adjusted preset yaw stop angle within the adjusted preset yaw stop delay duration, the yaw control system stops yawing.

In the embodiment, when the yaw control system identifies that the wind facing angle center value is greater than the preset first angle threshold, it is determined that the wind facing angle corresponding to a maximum value of the operating duration is relatively large, which in turn indicates that the wind facing angle of the wind turbine generator set is still relatively large under the yaw control of the yaw control system, that is to say, the yaw control effect of the yaw control strategy is poor. The yaw control system may adjust the preset yaw initiation angle, the preset yaw stop angle, the preset yaw wait duration and the preset yaw stop delay duration, so that the yaw control system, by the above-mentioned manner, may subsequently reduce the wind facing angle of the wind turbine generator set to a greater extent when performing yaw control according to the adjusted yaw control strategy.

Figure 4:
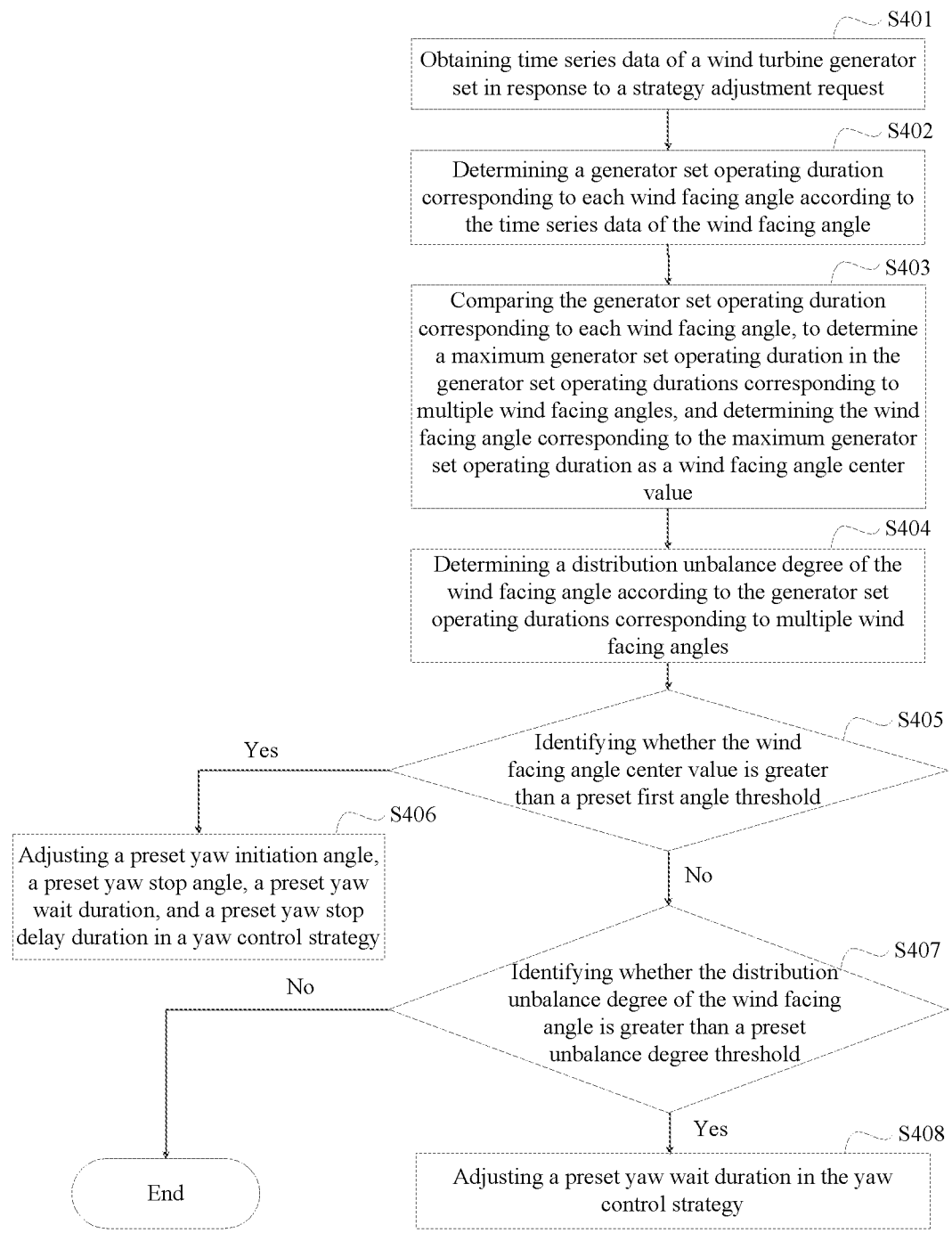
FIG. 4 is a schematic flowchart of Embodiment 4 of an adjusting method of a yaw control strategy provided by an embodiment of the present application.

FIG. 4 is a schematic flowchart of Embodiment 4 of an adjusting method of a yaw control strategy provided by an embodiment of the present application. Referring to FIG. 4, the method specifically includes the following steps.

S401: obtaining time series data of a wind turbine generator set in response to a strategy adjustment request.

In the embodiment, the yaw control system may obtain the time series data of the wind turbine generator set in response to the strategy adjustment request. Where the time series data of the wind turbine generator set includes time series data of the wind facing angle.

S402: determining a generator set operating duration corresponding to each wind facing angle according to the time series data of the wind facing angle.

S403: comparing the generator set operating duration corresponding to each wind facing angle, to determine a maximum generator set operating duration in the generator set operating durations corresponding to multiple wind facing angles, and determining the wind facing angle corresponding to the maximum generator set operating duration as a wind facing angle center value.

In the embodiment, the yaw control system may compare the generator set operating duration corresponding to each wind facing angle, to determine a maximum generator set operating duration in the generator set operating durations corresponding to multiple wind facing angles, and determine the wind facing angle corresponding to the maximum generator set operating duration as a wind facing angle center value.

S404: determining a distribution unbalance degree of the wind facing angle according to the generator set operating durations corresponding to the multiple wind facing angles.

In the embodiment, the yaw control system may determine the distribution unbalance degree of the wind facing angle according to the generator set operating durations corresponding to the multiple wind facing angles.

Specifically, the yaw control system may, according to the generator set operating durations corresponding to the multiple wind facing angles, determine a generator set operating duration corresponding to each wind facing angle greater than a preset second angle threshold, and determine a generator set operating duration corresponding to each wind facing angle less than the preset second angle threshold.

The yaw control system may determine a first total generator set operating duration according to generator set operating durations corresponding to multiple wind facing angles greater than the preset second angle threshold.

The yaw control system may determine a second total generator set operating duration according to generator set operating durations corresponding to multiple wind facing angles less than the preset second angle threshold. The yaw control system may determine the distribution unbalance degree of the wind facing angle according to the first total generator set operating duration and the second total generator set operating duration. In an implementation, the yaw control system may divide the first total generator set operating duration by the second total generator set operating duration to calculate and obtain the distribution unbalance degree of the wind facing angle.

S405: identifying whether the wind facing angle center value is greater than a preset first angle threshold.

In the embodiment, the yaw control system may identify whether the wind facing angle center value is greater than a preset first angle threshold. Exemplarily, the preset first angle threshold may be 2°.

When the yaw control system identifies that the wind facing angle center value is greater than the preset first angle threshold, it performs S406; when the yaw control system identifies that the wind facing angle center value is less than or equal to the preset first angle threshold, it performs S407.

S406: adjusting a preset yaw initiation angle, a preset yaw stop angle, a preset yaw wait duration, and a preset yaw stop delay duration in the yaw control strategy.

S407: identifying whether the distribution unbalance degree of the wind facing angle is greater than a preset unbalance degree threshold.

In the embodiment, the yaw control system may identify whether the distribution unbalance degree of the wind facing angle is greater than a preset unbalance degree threshold when identifying that the wind facing angle center value is less than or equal to the preset first angle threshold. Exemplarily, the preset unbalance degree threshold may be 1.15.

The yaw control system may perform S408 when identifying that the distribution unbalance degree of the wind facing angle is greater than the preset unbalance degree threshold; and ends when identifying that the distribution unbalance degree of the wind facing angle is less than or equal to the preset unbalance degree threshold.

S408: adjusting the preset yaw wait duration in the yaw control strategy.

In the embodiment, when identifying that the distribution unbalance degree of the wind facing angle is greater than or equal to the preset unbalance degree threshold the yaw control system may adjust the preset yaw wait duration in the yaw control strategy to obtain an adjusted preset yaw wait duration.

The yaw control system may monitor and obtain the wind facing angle. When identifying that the wind facing angle reaches the preset yaw initiation angle, the yaw control system starts timing, and when identifying that the duration when the wind facing angle reaches the preset yaw initiation angle reaches the preset yaw wait duration, the yaw control system controls the wind turbine generator set to yaw, so as to gradually reduce the wind facing angle.

When identifying that the wind facing angle after yaw reaches the preset yaw stop angle, the yaw control system starts timing. The yaw control system stops yawing after identifying that the timing duration reaches the preset yaw stop delay duration.

In the embodiment, when the yaw control system identifies that the wind facing angle center value is less than or equal to the preset first angle threshold and the distribution unbalance degree of the wind facing angle is greater than the preset unbalance degree threshold, it is determined that there is an imbalance between left and right deviations of the wind turbine generator set under the yaw control of the yaw control system, that is to say, the yaw control effect of the yaw control strategy is poor. The yaw control system may adjust the preset yaw wait duration, so that when performing yaw control according to the adjusted yaw control strategy by the above-mentioned manner, the yaw control system may subsequently yaw more quickly in response to the wind facing angle reaching the preset yaw initiation angle, and thus reduce the wind facing angle of the wind turbine generator set to a greater extent.

By Embodiment 5 of the method, the following is a description of a process that the yaw control system adjusts the corresponding yaw control strategy in the case that the time series data of the wind turbine generator set includes the time series data of the wind facing angle and the time series data of the wind speed and the time series data of the wind facing angle corresponds to the time series data of the wind speed.

In the embodiment, in the case that the time series data of the wind turbine generator set includes the time series data of the wind facing angle and the time series data of the wind speed and the time series data of the wind facing angle corresponds to the time series data of the wind speed, the yaw control system may, among the time series data of the wind facing angle, determine the time series data of the wind facing angle corresponding to the wind speed less than a preset high and low wind speed boundary threshold, as the time series data of the wind facing angle at a low wind speed, and determine the time series data of the wind facing angle corresponding to the wind speed greater than or equal to the preset high and low wind speed boundary threshold, as the time series data of the wind facing angle at a high wind speed.

Figure 5A:
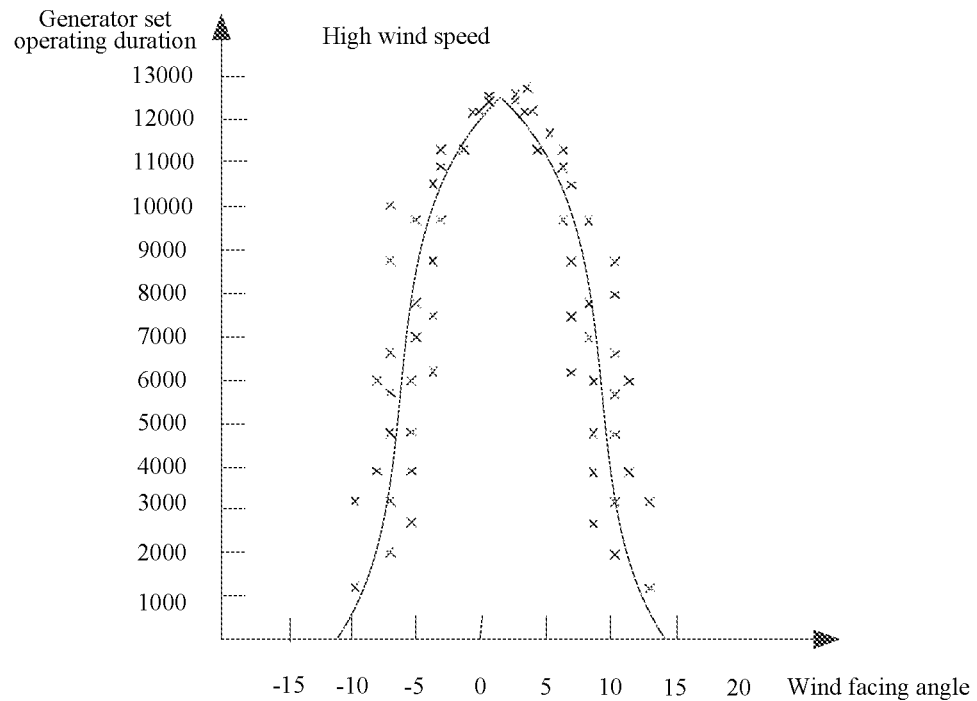
FIG. 5A is a schematic diagram of time series data of a wind facing angle at a high wind speed and Gaussian distribution fitting according to an embodiment of the present application.

FIG. 5A is a schematic diagram of time series data of a wind facing angle at a high wind speed and Gaussian distribution fitting according to an embodiment of the present application. For the time series data of the wind facing angle at the high wind speed, the yaw control system may determine a generator set operating duration corresponding to each wind facing angle at the high wind speed according to the time series data of the wind facing angle at the high wind speed. The yaw control system may determine a data distribution characteristic of the generator set operating duration corresponding to the wind facing angle at the high wind speed according to the generator set operating durations corresponding to multiple wind facing angles at the high wind speed. When identifying that the data distribution characteristic of the generator set operating duration corresponding to the wind facing angle at the high wind speed meets a corresponding high wind speed strategy adjustment condition, the yaw control system may adjust a high wind speed yaw control strategy. That is to say, the yaw control system may adjust a preset yaw initiation angle, a preset yaw stop angle, a preset yaw wait duration, and/or a preset yaw stop delay duration in the high wind speed yaw control strategy, to perform yaw control on the wind turbine generator set when the wind speed is the high wind speed according to the adjusted high wind speed yaw control strategy.

Figure 5B:
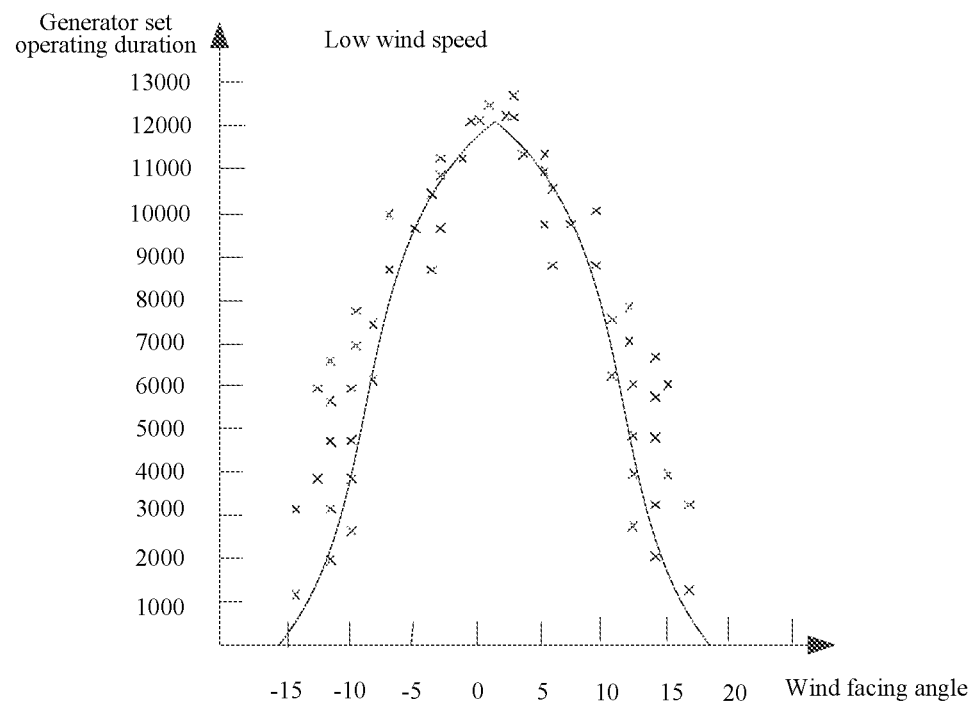
FIG. 5B is a schematic diagram of time series data of a wind facing angle at a low wind speed and Gaussian distribution fitting according to an embodiment of the present application.

FIG. 5B is a schematic diagram of time series data of a wind facing angle at a low wind speed and Gaussian distribution fitting according to an embodiment of the present application. For the time series data of the wind facing angle at the low wind speed, the yaw control system may determine a generator set operating duration corresponding to each wind facing angle at the low wind speed according to the time series data of the wind facing angle at the low wind speed, and determine a data distribution characteristic of the generator set operating duration corresponding to the wind facing angle at the low wind speed according to the generator set operating durations corresponding to multiple wind facing angles at the low wind speed. When identifying that the data distribution characteristic of the generator set operating duration corresponding to the wind facing angle at the low wind speed meets a corresponding low wind speed strategy adjustment condition, the yaw control system may adjust a low wind speed yaw control strategy. That is to say, the yaw control system may adjust a preset yaw initiation angle, a preset yaw stop angle, a preset yaw wait duration, and/or a preset yaw stop delay duration in the low wind speed yaw control strategy, to perform yaw control on the wind turbine generator set when the wind speed is the low wind speed according to the adjusted low wind speed yaw control strategy.

In the embodiment, the yaw control system may determine the data distribution characteristic of the generator set operating duration corresponding to the wind facing angle at the low wind speed, so as to determine whether the low wind speed yaw control strategy needs to be adjusted. The yaw control system may further determine the data distribution characteristic of the generator set operating duration corresponding to the wind facing angle at the high wind speed, so as to determine whether the high wind speed yaw control strategy needs to be adjusted. By the above-mentioned manner, a precise adjustment of the yaw control strategy is achieved, thereby improving the effect that the yaw control system subsequently controls the wind turbine generator set to yaw according to the adjusted yaw control strategy.

By Embodiment 6 of the method, the following is a description of a process for verifying the yaw control effect of the yaw control system after adjusting the yaw control strategy.

The present embodiment takes a wind turbine generator set in a wind farm as an example, and Table 1 shows the data distribution characteristic of the generator set operating duration corresponding to the wind facing angle of the wind turbine generator set.

TABLE 1

Data Distribution Characteristic of Generator Set Operating Duration Corresponding to Wind Facing Angle of Wind Turbine Generator Set

| Data distribution characteristic | Value of data distribution characteristic |
|---|---|
| Wind angle center value at low wind speed | 2.1 |
| Wind angle center value at high wind speed | 4.9 |
| Gaussian distribution standard deviation at low wind speed | 11.3 |
| Gaussian distribution standard deviation at high wind speed | 14.0 |
| Distribution unbalance degree of wind facing angle at low wind speed | 1.2 |
| Distribution unbalance degree of wind facing angle at high wind speed | 1.5 |

Based on the fact that the wind facing angle center value at the low wind speed is greater than the preset first angle threshold at the low wind speed, the Gaussian distribution standard deviation at the low wind speed is greater than the preset standard deviation at the low wind speed, the distribution unbalance degree of the wind facing angle at the low wind speed is greater than the preset unbalance degree threshold at the low wind speed, it can be known that the data distribution characteristic of the generator set operating duration corresponding to the wind facing angle at the low wind speed meets the corresponding strategy adjustment condition, and the preset yaw initiation angle, the preset yaw stop angle, the preset yaw wait duration, and the preset yaw stop delay duration in the low wind speed yaw control strategy may be adjusted.

Based on the fact that the wind facing angle center value at the high wind speed is greater than the preset first angle threshold at the high wind speed, the Gaussian distribution standard deviation at the high wind speed is greater than the preset standard deviation at the high wind speed, the distribution unbalance degree of the wind facing angle at the high wind speed is greater than the preset unbalance degree threshold at the high wind speed, it can be known that the data distribution characteristic of the generator set operating duration corresponding to the wind facing angle at the high wind speed meets the corresponding strategy adjustment condition, and the preset yaw initiation angle, the preset yaw stop angle, the preset yaw wait duration, and the preset yaw stop delay duration in the high wind speed yaw control strategy may be adjusted.

Figure 5C:
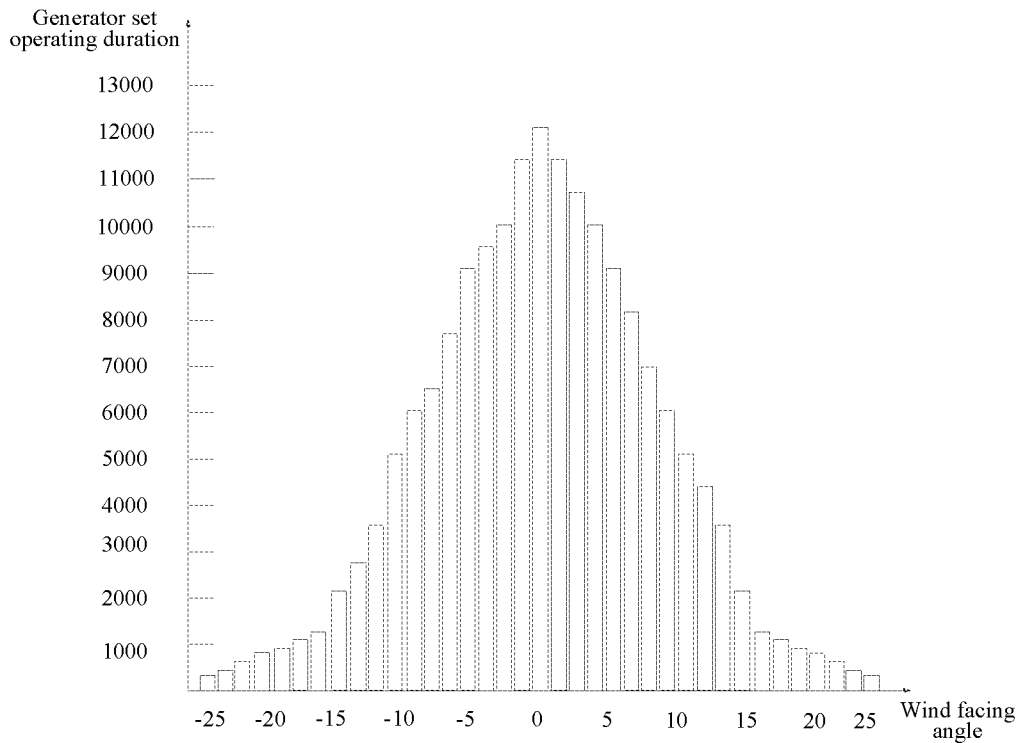
FIG. 5C is a schematic diagram of a wind facing angle and a generator set operating duration provided by an embodiment of the present application.

It has been verified that, in the process that the yaw control system performs yaw control on the wind turbine generator set according to the adjusted low wind speed yaw control strategy and the adjusted high wind speed yaw control strategy, the data distribution characteristic of the generator set operating duration corresponding to the wind facing angle determined based on the time series data of the wind facing angle does not meet the corresponding yaw control strategy, that is to say, the yaw control system has a good yaw control effect on the wind turbine generator set based on the adjusted yaw control strategy. FIG. 5C is a schematic diagram of a wind facing angle and a generator set operating duration provided by an embodiment of the present application. As shown in FIG. 5C, the wind facing angle center value of the yaw control system for yaw control based on the adjusted yaw control strategy is close to 0°, indicating good yaw control effect.

The following is a device embodiment of the present application that may be used to perform the method embodiments of the present application. For details not disclosed in the device embodiments of the present application, please refer to the method embodiments of the present application.

Figure 6:
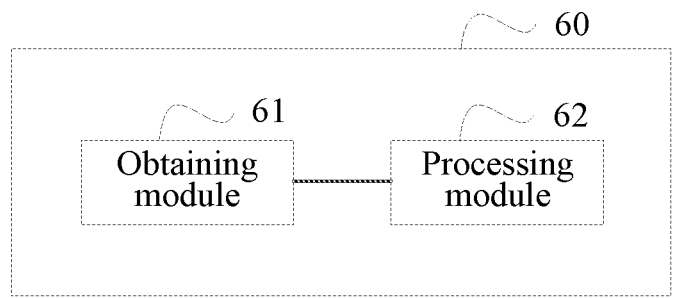
FIG. 6 is a structural schematic diagram of a yaw control system provided by an embodiment of the present application.

FIG. 6 is a structural schematic diagram of a yaw control system provided by an embodiment of the present application. As shown in FIG. 6, the yaw control system 60 includes an obtaining module 61 and a processing module 62. Where the obtaining module 61 is configured to obtain time series data of a wind turbine generator set in response to a strategy adjustment request; where the time series data of the wind turbine generator set includes time series data of a wind facing angle; the processing module 62 is configured to determine a generator set operating duration corresponding to each wind facing angle according to the time series data of the wind facing angle; the processing module 62 is further configured to determine a data distribution characteristic of the generator set operating duration corresponding to the wind facing angle according to generator set operating durations corresponding to multiple wind facing angles; and the processing module 62 is further configured to, when identifying that the data distribution characteristic of the generator set operating duration corresponding to the wind facing angle meets a corresponding strategy adjustment condition, adjust a yaw control strategy, to perform yaw control on the wind turbine generator set according to the adjusted yaw control strategy.

The yaw control system provided by the embodiment of the present application may perform the technical solutions shown in the above method embodiments, and its implementation principle and beneficial effect are similar to the latter, and will not be repeated herein.

In an implementation, the processing module 62 is specifically configured to: perform Gaussian distribution fitting on the generator set operating durations corresponding to the multiple wind facing angles, to determine a Gaussian distribution standard deviation; and when identifying that the Gaussian distribution standard deviation is greater than a preset standard deviation, adjust the preset yaw wait duration and the preset yaw stop delay duration in the yaw control strategy.

The yaw control system provided by the embodiment of the present application may perform the technical solutions shown in the above method embodiments, and its implementation principle beneficial effect are similar to the latter, and will not be repeated herein.

In an implementation, the processing module 62 is specifically configured to: compare the generator set operating duration corresponding to each wind facing angle, to determine a maximum generator set operating duration in the generator set operating durations corresponding to the multiple wind facing angles, and determine the wind facing angle corresponding to the maximum generator set operating duration as a wind facing angle center value; adjust the preset yaw initiation angle, the preset yaw stop angle, the preset yaw wait duration, and the preset yaw stop delay duration in the yaw control strategy when identifying that the wind facing angle center value is greater than the preset first angle threshold.

The yaw control system provided by the embodiment of the present application may perform the technical solutions shown in the above method embodiments, and its implementation principle and beneficial effect are similar to the latter, and will not be repeated herein.

In an implementation, the processing module 62 is further configured to: determine a distribution unbalance degree of the wind facing angle according to the generator set operating durations corresponding to the multiple wind facing angles; identify whether the distribution unbalance degree of the wind facing angle is greater than a preset unbalance degree threshold when identifying that the wind facing angle center value is less than or equal to the preset first angle threshold; and adjust the preset yaw wait duration in the yaw control strategy when identifying that the distribution unbalance degree of the wind facing angle is greater than the preset unbalance degree threshold.

The yaw control system provided by the embodiment of the present application may perform the technical solutions shown in the above method embodiments, and its implementation principle and beneficial effect are similar to the latter, and will not be repeated herein.

In an implementation, the processing module 62 is specifically configured to: according to the generator set operating durations corresponding to the multiple wind facing angles, determine generator set operating duration corresponding to each wind facing angle greater than a preset second angle threshold and determine generator set operating duration corresponding to each wind facing angle less than the preset second angle threshold; determine a first total generator set operating duration according to the generator set operating durations corresponding to the multiple wind facing angles greater than the preset second angle threshold; determine a second total generator set operating duration according to the generator set operating durations corresponding to the multiple wind facing angles less than the preset second angle threshold; and determine the distribution unbalance degree of the wind facing angle according to the first total generator set operating duration and the second total generator set operating duration.

The yaw control system provided by the embodiment of the present application may perform the technical solutions shown in the above method embodiments, and its implementation principle and beneficial effect are similar to the latter, and will not be repeated herein.

In an implementation, the time series data of the wind turbine generator set further includes time series data of wind speed; the time series data of the wind speed corresponds to the time series data of the wind facing angle; the processing module 62 is further configured to: in the time series data of the wind facing angle, determine the time series data of the wind facing angle corresponding to wind speed less than a preset high and low wind speed boundary threshold as time series data of the wind facing angle at a low wind speed, and determine the time series data of the wind facing angle corresponding to wind speed greater than or equal to the preset high and low wind speed boundary threshold as time series data of the wind facing angle at a high wind speed; determine the generator set operating duration corresponding to each wind facing angle at the low wind speed according to the time series data of the wind facing angle at the low wind speed; determine the generator set operating duration corresponding to each wind facing angle at the high wind speed according to the time series data of the wind facing angle at the high wind speed; determine a data distribution characteristic of the generator set operating duration corresponding to the wind facing angle at the low wind speed according to the generator set operating durations corresponding to multiple wind facing angles at the low wind speed; determine a data distribution characteristic of the generator set operating duration corresponding to the wind facing angle at the high wind speed according to the generator set operating durations corresponding to multiple wind facing angles at the high wind speed; when identifying that the data distribution characteristic of the generator set operating duration corresponding to the wind facing angle at the low wind speed meets a corresponding low wind speed strategy adjustment condition, adjust a low wind speed yaw control strategy; and when identifying that the data distribution characteristic of the generator set operating duration corresponding to the wind facing angle at the high wind speed meets a corresponding high wind speed strategy adjustment condition, adjust a high wind speed yaw control strategy.

The yaw control system provided by the embodiment of the present application may perform the technical solutions shown in the above method embodiments, and its implementation principle and beneficial effect are similar to the latter, and will not be repeated herein.

In an implementation, the time series data of the wind turbine generator set further includes time series data of a wind turbine generator state; the time series data of the wind turbine generator state corresponds to the time series data of the wind facing angle; the processing module 62 is further configured to: in the time series data of the wind facing angle, determine time series data of the wind facing angle corresponding to the wind turbine generator state being a power generation state, as time series data of a filtered wind facing angle; determine generator set operating duration corresponding to each filtered wind facing angle according to the time series data of the filtered wind facing angle; and determine the data distribution characteristic of the generator set operating duration corresponding to the wind facing angle according to generator set operating durations corresponding to multiple filtered wind facing angles.

The yaw control system provided by the embodiment of the present application may perform the technical solutions shown in the above method embodiments, and its implementation principle and beneficial effect are similar to the latter, and will not be repeated herein.

Figure 7:
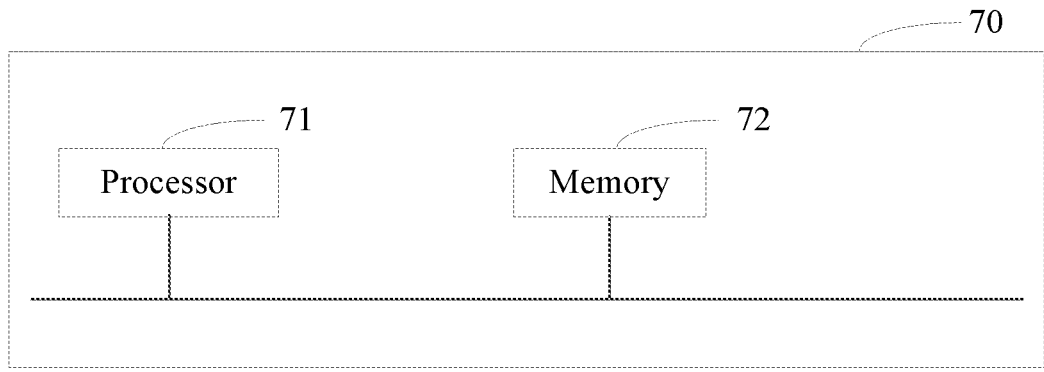
FIG. 7 is a structural diagram of a yaw control system provided by an embodiment of the present application.

FIG. 7 is a structural diagram of a yaw control system provided by an embodiment of the present application. As shown in FIG. 7, the yaw control system 70 includes a processor 71 and a memory 72. Where the processor 71 is communicatively connected to the memory 72, the memory 72 is used to store computer executable instructions; the processor 71 is configured to implement the technical solution in any one of the aforementioned method embodiments by executing the computer executable instructions stored in the memory 72.

In an implementation, the memory 72 can be either independent or integrated with the processor 71. In an implementation, when the memory 72 is a device independent of the processor 71, the yaw control system 70 may also include a bus for connecting the aforementioned devices.

The server is used to perform the technical solution in any one of the foregoing method embodiments, and its implementation principle and technical effect are similar to the latter, and will not be repeated here.

An embodiment of the present application also provides a computer readable storage medium storing computer executable instructions, which, when being executed by a processor, is used to implement the technical solution provided in any one of the aforementioned method embodiments.

An embodiment of the present application also provides a computer program product, including a computer program, which, when being executed by a processor, is used to implement the technical solutions provided in the aforementioned method embodiments.

An ordinary person skilled in the art may understand that all or part of the steps to implement the above method embodiments can be accomplished by hardware related to program instructions. The foregoing program may be stored in a computer readable storage medium. The program, when executed, executes the steps included in each of the aforementioned method embodiments; and the foregoing storage medium includes: a ROM, a RAM, a magnetic disc, or an optical disk, and other media that can store program codes.

Finally, it should be noted that the above embodiments are only used to illustrate the technical solutions of the present application, not to limit them; although the present application has been described in detail with reference to the foregoing embodiments, a person with ordinary skill in the art should understand that he may still modify the technical solutions recited in the foregoing embodiments or equivalently replace some or all of the technical features therein by equivalent ones; and these modifications or replacements do not take the essence of the corresponding technical solutions out of the scope of the technical solutions of the various embodiments of the present application.

What is claimed is:

1. An adjusting method of a yaw control strategy, applied to a yaw control system, comprising:
    obtaining time series data of a wind turbine generator set in response to a strategy adjustment request; wherein the time series data of the wind turbine generator set comprises time series data of a wind facing angle;
    determining a generator set operating duration corresponding to each wind facing angle according to the time series data of the wind facing angle;
    determining a data distribution characteristic of the generator set operating duration corresponding to the wind facing angle according to generator set operating durations corresponding to multiple wind facing angles; and
    adjusting the yaw control strategy in response to identifying that the data distribution characteristic of the generator set operating duration corresponding to the wind facing angle meets a corresponding strategy adjustment condition, to perform yaw control on the wind turbine generator set according to an adjusted yaw control strategy.

2. The adjusting method of a yaw control strategy according to claim 1, wherein the determining the data distribution characteristic of the generator set operating duration corresponding to the wind facing angle according to generator set operating durations corresponding to multiple wind facing angles comprises:
    performing Gaussian distribution fitting on the generator set operating durations corresponding to multiple wind facing angles, to determine a Gaussian distribution standard deviation; and
    in response to identifying that the Gaussian distribution standard deviation is greater than a preset standard deviation, adjusting a preset yaw wait duration and a preset yaw stop delay duration in the yaw control strategy.

3. The adjusting method of a yaw control strategy according to claim 2, wherein the time series data of the wind turbine generator set further comprises time series data of wind speed; the time series data of the wind speed corresponds to the time series data of the wind facing angle; the method further comprises:
    in the time series data of the wind facing angle, determining time series data of the wind facing angle corresponding to the wind speed less than a preset high and low wind speed boundary threshold as the time series data of the wind facing angle at a low wind speed, and determining time series data of the wind facing angle corresponding to the wind speed greater than or equal to the preset high and low wind speed boundary threshold as the time series data of the wind facing angle at a high wind speed;
    then, the determining the generator set operating duration corresponding to each wind facing angle according to the time series data of the wind facing angle comprises:
    determining a generator set operating duration corresponding to each wind facing angle at the low wind speed according to the time series data of the wind facing angle at the low wind speed;
    determining a generator set operating duration corresponding to each wind facing angle at the high wind speed according to the time series data of the wind facing angle at the high wind speed;
    then, the determining the data distribution characteristic of the generator set operating duration corresponding to the wind facing angle according to generator set operating durations corresponding to multiple wind facing angles comprises:
    determining a data distribution characteristic of the generator set operating duration corresponding to the wind facing angle at the low wind speed according to the generator set operating durations corresponding to multiple wind facing angles at the low wind speed;
    determining a data distribution characteristic of the generator set operating duration corresponding to the wind facing angle at the high wind speed according to the generator set operating durations corresponding to multiple wind facing angles at the high wind speed;
    then, the adjusting the yaw control strategy in response to identifying that the data distribution characteristic of the generator set operating duration corresponding to the wind facing angle meets the corresponding strategy adjustment condition, comprises:
    in response to identifying that the data distribution characteristic of the generator set operating duration corresponding to the wind facing angle at the low wind speed meets a corresponding low wind speed strategy adjustment condition, adjusting a low wind speed yaw control strategy; and
    in response to identifying that the data distribution characteristic of the generator set operating duration corresponding to the wind facing angle at the high wind speed meets a corresponding high wind speed strategy adjustment condition, adjusting a high wind speed yaw control strategy.

4. The adjusting method of a yaw control strategy according to claim 1, wherein the time series data of the wind turbine generator set further comprises time series data of wind speed; the time series data of the wind speed corresponds to the time series data of the wind facing angle; the method further comprises:
    in the time series data of the wind facing angle, determining time series data of the wind facing angle corresponding to the wind speed less than a preset high and low wind speed boundary threshold as the time series data of the wind facing angle at a low wind speed, and determining time series data of the wind facing angle corresponding to the wind speed greater than or equal to the preset high and low wind speed boundary threshold as the time series data of the wind facing angle at a high wind speed;
    then, the determining the generator set operating duration corresponding to each wind facing angle according to the time series data of the wind facing angle comprises:
    determining a generator set operating duration corresponding to each wind facing angle at the low wind speed according to the time series data of the wind facing angle at the low wind speed;

determining a generator set operating duration corresponding to each wind facing angle at the high wind speed according to the time series data of the wind facing angle at the high wind speed;

then, the determining the data distribution characteristic of the generator set operating duration corresponding to the wind facing angle according to generator set operating durations corresponding to multiple wind facing angles comprises:

determining a data distribution characteristic of the generator set operating duration corresponding to the wind facing angle at the low wind speed according to the generator set operating durations corresponding to multiple wind facing angles at the low wind speed;

determining a data distribution characteristic of the generator set operating duration corresponding to the wind facing angle at the high wind speed according to the generator set operating durations corresponding to multiple wind facing angles at the high wind speed;

then, the adjusting the yaw control strategy in response to identifying that the data distribution characteristic of the generator set operating duration corresponding to the wind facing angle meets the corresponding strategy adjustment condition, comprises:

in response to identifying that the data distribution characteristic of the generator set operating duration corresponding to the wind facing angle at the low wind speed meets a corresponding low wind speed strategy adjustment condition, adjusting a low wind speed yaw control strategy; and in response to identifying that the data distribution characteristic of the generator set operating duration corresponding to the wind facing angle at the high wind speed meets a corresponding high wind speed strategy adjustment condition, adjusting a high wind speed yaw control strategy.

5. The adjusting method of a yaw control strategy according to claim 4, wherein the time series data of the wind turbine generator set further comprises time series data of a wind turbine generator state; the time series data of the wind turbine generator state corresponds to the time series data of the wind facing angle; the method further comprises:

in the time series data of the wind facing angle, determining time series data of the wind facing angle corresponding to the wind turbine generator state being a power generation state, as time series data of a filtered wind facing angle;

then, the determining the generator set operating duration corresponding to each wind facing angle according to the time series data of the wind facing angle comprises:

determining a generator set operating duration corresponding to each filtered wind facing angle according to the time series data of the filtered wind facing angle;

then, the determining the data distribution characteristic of the generator set operating duration corresponding to the wind facing angle according to generator set operating durations corresponding to multiple wind facing angles comprises:

determining the data distribution characteristic of the generator set operating duration corresponding to the wind facing angle according to generator set operating durations corresponding to multiple filtered wind facing angles.

6. The adjusting method of a yaw control strategy according to claim 1, wherein the determining the data distribution characteristic of the generator set operating duration corresponding to the wind facing angle according to generator set operating durations corresponding to multiple wind facing angles comprises:

comparing the generator set operating duration corresponding to each wind facing angle, to determine a maximum generator set operating duration in the generator set operating durations corresponding to the multiple wind facing angles, and determining the wind facing angle corresponding to the maximum generator set operating duration as a wind facing angle center value;

then, the adjusting the yaw control strategy in response to identifying that the data distribution characteristic of the generator set operating duration corresponding to the wind facing angle meets the corresponding strategy adjustment condition, comprises:

adjusting a preset yaw initiation angle, a preset yaw stop angle, a preset yaw wait duration, and a preset yaw stop delay duration in the yaw control strategy in response to identifying that the wind facing angle center value is greater than a preset first angle threshold.

7. The adjusting method of a yaw control strategy according to claim 6, wherein the time series data of the wind turbine generator set further comprises time series data of wind speed; the time series data of the wind speed corresponds to the time series data of the wind facing angle; the method further comprises:

in the time series data of the wind facing angle, determining time series data of the wind facing angle corresponding to the wind speed less than a preset high and low wind speed boundary threshold as the time series data of the wind facing angle at a low wind speed, and determining time series data of the wind facing angle corresponding to the wind speed greater than or equal to the preset high and low wind speed boundary threshold as the time series data of the wind facing angle at a high wind speed;

then, the determining the generator set operating duration corresponding to each wind facing angle according to the time series data of the wind facing angle comprises:

determining a generator set operating duration corresponding to each wind facing angle at the low wind speed according to the time series data of the wind facing angle at the low wind speed;

determining a generator set operating duration corresponding to each wind facing angle at the high wind speed according to the time series data of the wind facing angle at the high wind speed;

then, the determining the data distribution characteristic of the generator set operating duration corresponding to the wind facing angle according to generator set operating durations corresponding to multiple wind facing angles comprises:

determining a data distribution characteristic of the generator set operating duration corresponding to the wind facing angle at the low wind speed according to the generator set operating durations corresponding to multiple wind facing angles at the low wind speed;

determining a data distribution characteristic of the generator set operating duration corresponding to the wind facing angle at the high wind speed according to the generator set operating durations corresponding to multiple wind facing angles at the high wind speed;

then, the adjusting the yaw control strategy in response to identifying that the data distribution characteristic of the generator set operating duration corresponding to the wind facing angle meets the corresponding strategy adjustment condition, comprises:
in response to identifying that the data distribution characteristic of the generator set operating duration corresponding to the wind facing angle at the low wind speed meets a corresponding low wind speed strategy adjustment condition, adjusting a low wind speed yaw control strategy; and
in response to identifying that the data distribution characteristic of the generator set operating duration corresponding to the wind facing angle at the high wind speed meets a corresponding high wind speed strategy adjustment condition, adjusting a high wind speed yaw control strategy.

8. The adjusting method of a yaw control strategy according to claim 6, wherein the determining the data distribution characteristic of the generator set operating duration corresponding to the wind facing angle according to generator set operating durations corresponding to multiple wind facing angles further comprises:
determining a distribution unbalance degree of the wind facing angle according to the generator set operating durations corresponding to the multiple wind facing angles;
then, the adjusting the yaw control strategy in response to identifying that the data distribution characteristic of the generator set operating duration corresponding to the wind facing angle meets the corresponding strategy adjustment condition, further comprises:
identifying whether the distribution unbalance degree of the wind facing angle is greater than a preset unbalance degree threshold in response to identifying that the wind facing angle center value is less than or equal to the preset first angle threshold; and
adjusting the preset yaw wait duration in the yaw control strategy in response to identifying that the distribution unbalance degree of the wind facing angle is greater than the preset unbalance degree threshold.

9. The adjusting method of a yaw control strategy according to claim 8, wherein the time series data of the wind turbine generator set further comprises time series data of wind speed; the time series data of the wind speed corresponds to the time series data of the wind facing angle; the method further comprises:
in the time series data of the wind facing angle, determining time series data of the wind facing angle corresponding to the wind speed less than a preset high and low wind speed boundary threshold as the time series data of the wind facing angle at a low wind speed, and determining time series data of the wind facing angle corresponding to the wind speed greater than or equal to the preset high and low wind speed boundary threshold as the time series data of the wind facing angle at a high wind speed;
then, the determining the generator set operating duration corresponding to each wind facing angle according to the time series data of the wind facing angle comprises:
determining a generator set operating duration corresponding to each wind facing angle at the low wind speed according to the time series data of the wind facing angle at the low wind speed;
determining a generator set operating duration corresponding to each wind facing angle at the high wind speed according to the time series data of the wind facing angle at the high wind speed;
then, the determining the data distribution characteristic of the generator set operating duration corresponding to the wind facing angle according to generator set operating durations corresponding to multiple wind facing angles comprises:
determining a data distribution characteristic of the generator set operating duration corresponding to the wind facing angle at the low wind speed according to the generator set operating durations corresponding to multiple wind facing angles at the low wind speed;
determining a data distribution characteristic of the generator set operating duration corresponding to the wind facing angle at the high wind speed according to the generator set operating durations corresponding to multiple wind facing angles at the high wind speed;
then, the adjusting the yaw control strategy in response to identifying that the data distribution characteristic of the generator set operating duration corresponding to the wind facing angle meets the corresponding strategy adjustment condition, comprises:
in response to identifying that the data distribution characteristic of the generator set operating duration corresponding to the wind facing angle at the low wind speed meets a corresponding low wind speed strategy adjustment condition, adjusting a low wind speed yaw control strategy; and
in response to identifying that the data distribution characteristic of the generator set operating duration corresponding to the wind facing angle at the high wind speed meets a corresponding high wind speed strategy adjustment condition, adjusting a high wind speed yaw control strategy.

10. The adjusting method of a yaw control strategy according to claim 8, wherein the determining the distribution unbalance degree of the wind facing angle according to the generator set operating durations corresponding to the multiple wind facing angles comprises:
according to the generator set operating durations corresponding to the multiple wind facing angles, determining the generator set operating duration corresponding to each wind facing angle greater than a preset second angle threshold and determining the generator set operating duration corresponding to each wind facing angle less than the preset second angle threshold;
determining a first total generator set operating duration according to generator set operating durations corresponding to multiple wind facing angles greater than the preset second angle threshold;
determining a second total generator set operating duration according to generator set operating durations corresponding to multiple wind facing angles less than the preset second angle threshold; and
determining the distribution unbalance degree of the wind facing angle according to the first total generator set operating duration and the second total generator set operating duration.

11. The adjusting method of a yaw control strategy according to claim 10, wherein the time series data of the wind turbine generator set further comprises time series data of wind speed; the time series data of the wind speed corresponds to the time series data of the wind facing angle; the method further comprises:
in the time series data of the wind facing angle, determining time series data of the wind facing angle corresponding to the wind speed less than a preset high and low wind speed boundary threshold as the time series data of the wind facing angle at a low wind speed, and determining time series data of the wind facing angle corresponding to the wind speed greater than or equal to the preset high and low wind speed boundary threshold as the time series data of the wind facing angle at a high wind speed;

then, the determining the generator set operating duration corresponding to each wind facing angle according to the time series data of the wind facing angle comprises:

determining a generator set operating duration corresponding to each wind facing angle at the low wind speed according to the time series data of the wind facing angle at the low wind speed;

determining a generator set operating duration corresponding to each wind facing angle at the high wind speed according to the time series data of the wind facing angle at the high wind speed;

then, the determining the data distribution characteristic of the generator set operating duration corresponding to the wind facing angle according to generator set operating durations corresponding to multiple wind facing angles comprises:

determining a data distribution characteristic of the generator set operating duration corresponding to the wind facing angle at the low wind speed according to the generator set operating durations corresponding to multiple wind facing angles at the low wind speed;

determining a data distribution characteristic of the generator set operating duration corresponding to the wind facing angle at the high wind speed according to the generator set operating durations corresponding to multiple wind facing angles at the high wind speed;

then, the adjusting the yaw control strategy in response to identifying that the data distribution characteristic of the generator set operating duration corresponding to the wind facing angle meets the corresponding strategy adjustment condition, comprises:

in response to identifying that the data distribution characteristic of the generator set operating duration corresponding to the wind facing angle at the low wind speed meets a corresponding low wind speed strategy adjustment condition, adjusting a low wind speed yaw control strategy; and in response to identifying that the data distribution characteristic of the generator set operating duration corresponding to the wind facing angle at the high wind speed meets a corresponding high wind speed strategy adjustment condition, adjusting a high wind speed yaw control strategy.

12. A non-transitory computer readable storage medium, wherein the computer readable storage medium stores a computer executable instruction, which, when being executed by a processor, is used to implement the adjusting method of the yaw control strategy according to claim 1.

13. A yaw control system, comprising a processor, and a memory communicatively connected to the processor;

the memory stores a computer executable instruction;

the processor executes the computer executable instruction stored in the memory to be enabled to:

obtain time series data of a wind turbine generator set in response to a strategy adjustment request; wherein the time series data of the wind turbine generator set comprises time series data of a wind facing angle;

determine a generator set operating duration corresponding to each wind facing angle according to the time series data of the wind facing angle;

determine a data distribution characteristic of the generator set operating duration corresponding to the wind facing angle according to generator set operating durations corresponding to multiple wind facing angles; and adjust a yaw control strategy in response to identifying that the data distribution characteristic of the generator set operating duration corresponding to the wind facing angle meets a corresponding strategy adjustment condition, to perform yaw control on the wind turbine generator set according to an adjusted yaw control strategy.

14. The yaw control system according to claim 13, wherein the processor is further enabled to:

perform Gaussian distribution fitting on the generator set operating durations corresponding to multiple wind facing angles, to determine a Gaussian distribution standard deviation; and in response to identifying that the Gaussian distribution standard deviation is greater than a preset standard deviation, adjust a preset yaw wait duration and a preset yaw stop delay duration in the yaw control strategy.

15. The yaw control system according to claim 14, wherein the processor is further enabled to:

in the time series data of the wind facing angle, determine time series data of the wind facing angle corresponding to the wind speed less than a preset high and low wind speed boundary threshold as the time series data of the wind facing angle at a low wind speed, and determine time series data of the wind facing angle corresponding to the wind speed greater than or equal to the preset high and low wind speed boundary threshold as the time series data of the wind facing angle at a high wind speed;

determine a generator set operating duration corresponding to each wind facing angle at the low wind speed according to the time series data of the wind facing angle at the low wind speed; determine a generator set operating duration corresponding to each wind facing angle at the high wind speed according to the time series data of the wind facing angle at the high wind speed;

determine a data distribution characteristic of the generator set operating duration corresponding to the wind facing angle at the low wind speed according to the generator set operating durations corresponding to multiple wind facing angles at the low wind speed;

determine a data distribution characteristic of the generator set operating duration corresponding to the wind facing angle at the high wind speed according to the generator set operating durations corresponding to multiple wind facing angles at the high wind speed;

in response to identifying that the data distribution characteristic of the generator set operating duration corresponding to the wind facing angle at the low wind speed meets a corresponding low wind speed strategy adjustment condition, adjust a low wind speed yaw control strategy; and in response to identifying that the data distribution characteristic of the generator set operating duration corresponding to the wind facing angle at the high wind speed meets a corresponding high wind speed strategy adjustment condition, adjust a high wind speed yaw control strategy.

16. The yaw control system according to claim 13, wherein the processor is further enabled to:

in the time series data of the wind facing angle, determine time series data of the wind facing angle corresponding to the wind speed less than a preset high and low wind speed boundary threshold as the time series data of the wind facing angle at a low wind speed, and determine time series data of the wind facing angle corresponding to the wind speed greater than or equal to the preset high and low wind speed boundary threshold as the time series data of the wind facing angle at a high wind speed;

determine a generator set operating duration corresponding to each wind facing angle at the low wind speed according to the time series data of the wind facing angle at the low wind speed;

determine a generator set operating duration corresponding to each wind facing angle at the high wind speed according to the time series data of the wind facing angle at the high wind speed;

determine a data distribution characteristic of the generator set operating duration corresponding to the wind facing angle at the low wind speed according to the generator set operating durations corresponding to multiple wind facing angles at the low wind speed;

determine a data distribution characteristic of the generator set operating duration corresponding to the wind facing angle at the high wind speed according to the generator set operating durations corresponding to multiple wind facing angles at the high wind speed;

in response to identifying that the data distribution characteristic of the generator set operating duration corresponding to the wind facing angle at the low wind speed meets a corresponding low wind speed strategy adjustment condition, adjust a low wind speed yaw control strategy; and in response to identifying that the data distribution characteristic of the generator set operating duration corresponding to the wind facing angle at the high wind speed meets a corresponding high wind speed strategy adjustment condition, adjust a high wind speed yaw control strategy.

17. The yaw control system according to claim 16, wherein the processor is further enabled to:

in the time series data of the wind facing angle, determine time series data of the wind facing angle corresponding to the wind turbine generator state being a power generation state, as time series data of a filtered wind facing angle;

determine a generator set operating duration corresponding to each filtered wind facing angle according to the time series data of the filtered wind facing angle;

determine the data distribution characteristic of the generator set operating duration corresponding to the wind facing angle according to generator set operating durations corresponding to multiple filtered wind facing angles.

18. The yaw control system according to claim 13, wherein the processor is further enabled to:

compare the generator set operating duration corresponding to each wind facing angle, to determine a maximum generator set operating duration in the generator set operating durations corresponding to the multiple wind facing angles, and determine the wind facing angle corresponding to the maximum generator set operating duration as a wind facing angle center value; and adjust a preset yaw initiation angle, a preset yaw stop angle, a preset yaw wait duration, and a preset yaw stop delay duration in the yaw control strategy in response to identifying that the wind facing angle center value is greater than a preset first angle threshold.

19. The yaw control system according to claim 18, wherein the processor is further enabled to:

determine a distribution unbalance degree of the wind facing angle according to the generator set operating durations corresponding to the multiple wind facing angles;

identify whether the distribution unbalance degree of the wind facing angle is greater than a preset unbalance degree threshold in response to identifying that the wind facing angle center value is less than or equal to the preset first angle threshold; and adjust the preset yaw wait duration in the yaw control strategy in response to identifying that the distribution unbalance degree of the wind facing angle is greater than the preset unbalance degree threshold.

20. The yaw control system according to claim 19, wherein the processor is further enabled to:

according to the generator set operating durations corresponding to the multiple wind facing angles, determine the generator set operating duration corresponding to each wind facing angle greater than a preset second angle threshold and determine the generator set operating duration corresponding to each wind facing angle less than the preset second angle threshold;

determine a first total generator set operating duration according to generator set operating durations corresponding to multiple wind facing angles greater than the preset second angle threshold;

determine a second total generator set operating duration according to generator set operating durations corresponding to multiple wind facing angles less than the preset second angle threshold; and determine the distribution unbalance degree of the wind facing angle according to the first total generator set operating duration and the second total generator set operating duration.

* * * * *